US009208070B2

(12) United States Patent
D'Abreu et al.

(10) Patent No.: US 9,208,070 B2
(45) Date of Patent: Dec. 8, 2015

(54) WEAR LEVELING OF MULTIPLE MEMORY DEVICES

(75) Inventors: Manuel Antonio D'Abreu, El Dorado Hills, CA (US); Stephen Skala, Fremont, CA (US)

(73) Assignee: SANDISK TECHNOLOGIES INC., Plano, TX (US)

(*) Notice: Subject to any disclaimer, the term of this patent is extended or adjusted under 35 U.S.C. 154(b) by 70 days.

(21) Appl. No.: 13/331,853

(22) Filed: Dec. 20, 2011

(65) Prior Publication Data
US 2013/0159766 A1 Jun. 20, 2013

(51) Int. Cl.
G06F 11/20 (2006.01)
G06F 12/02 (2006.01)

(52) U.S. Cl.
CPC .... G06F 12/0246 (2013.01); *G06F 2212/1036* (2013.01); *G06F 2212/7208* (2013.01); *G06F 2212/7211* (2013.01)

(58) Field of Classification Search
CPC ............... G06F 2212/1032; G06F 2212/1036; G06F 2212/7206; G06F 2212/7209; G06F 2212/7211; G06F 3/0616; G06F 11/1048; G06F 11/1068
USPC .................. 714/6.2, 6.32, 710, 711
See application file for complete search history.

(56) References Cited

U.S. PATENT DOCUMENTS

| | | | |
|---|---|---|---|
| 5,812,803 A | 9/1998 | Pawlowski et al. | |
| 6,081,447 A * | 6/2000 | Lofgren et al. | 365/185.02 |
| 6,313,493 B1 | 11/2001 | Mori et al. | |
| 6,725,321 B1 | 4/2004 | Sinclair et al. | |
| 6,787,825 B1 | 9/2004 | Gudesen et al. | |
| 6,933,195 B2 | 8/2005 | Lee | |
| 6,990,040 B2 | 1/2006 | Ohshima et al. | |
| 7,516,295 B2 * | 4/2009 | In et al. | 711/202 |
| 7,574,648 B2 | 8/2009 | Akiyama et al. | |
| 7,631,245 B2 | 12/2009 | Lasser | |
| 7,894,229 B2 | 2/2011 | Lahtinen et al. | |
| 8,028,123 B2 | 9/2011 | Kilzer et al. | |
| 8,291,295 B2 * | 10/2012 | Harari et al. | 714/763 |
| 8,621,271 B2 * | 12/2013 | Grube et al. | 714/6.32 |
| 2005/0068802 A1 * | 3/2005 | Tanaka | 365/145 |
| 2006/0285422 A1 | 12/2006 | Scheuerlein | |
| 2007/0234172 A1 | 10/2007 | Chiabrera | |

(Continued)

FOREIGN PATENT DOCUMENTS

EP 1840722 A2 10/2007

OTHER PUBLICATIONS

The International Search Report and Written Opinion mailed Feb. 26, 2013 in International Application No. PCT/ US2012/065334, 11 pages.

(Continued)

*Primary Examiner* — Joseph Schell
(74) *Attorney, Agent, or Firm* — Toler Law Group, PC

(57) ABSTRACT

A method of managing wear leveling in a data storage device includes determining whether a reliability measurement associated with a first portion of a first nonvolatile memory die satisfies a threshold. The first nonvolatile memory die is included in a plurality of memory dies. The method includes, in response to determining that the reliability measurement associated with the first portion of the first nonvolatile memory die satisfies the threshold, transferring first data from the first portion of the first nonvolatile memory die to a second nonvolatile memory die of the plurality of memory dies.

35 Claims, 8 Drawing Sheets

(56) References Cited

U.S. PATENT DOCUMENTS

| | | | |
|---|---|---|---|
| 2007/0250857 A1 | 10/2007 | Frost-Reubling et al. | |
| 2007/0263442 A1 | 11/2007 | Cornwell et al. | |
| 2008/0126678 A1 | 5/2008 | Mizushima | |
| 2008/0153200 A1 | 6/2008 | Sitaram | |
| 2008/0310230 A1 | 12/2008 | Kim et al. | |
| 2008/0320214 A1 | 12/2008 | Ma et al. | |
| 2009/0020857 A1 | 1/2009 | Cusack et al. | |
| 2009/0063923 A1 | 3/2009 | Gower et al. | |
| 2009/0138654 A1* | 5/2009 | Sutardja | 711/103 |
| 2009/0243732 A1 | 10/2009 | Tarng et al. | |
| 2010/0011159 A1 | 1/2010 | Sutardja | |
| 2010/0064111 A1 | 3/2010 | Kunimatsu et al. | |
| 2010/0091537 A1 | 4/2010 | Best et al. | |
| 2010/0110748 A1 | 5/2010 | Best | |
| 2010/0250831 A1 | 9/2010 | O'Brien et al. | |
| 2010/0306456 A1 | 12/2010 | Schmidberger | |
| 2010/0325346 A1* | 12/2010 | Huang | 711/103 |
| 2010/0325350 A1* | 12/2010 | Sunaga | 711/103 |
| 2011/0040924 A1 | 2/2011 | Selinger | |
| 2011/0069526 A1 | 3/2011 | Schuette | |
| 2011/0161784 A1 | 6/2011 | Selinger et al. | |
| 2011/0167319 A1 | 7/2011 | Jeddeloh | |
| 2011/0302359 A1 | 12/2011 | Schmidberger | |
| 2012/0023144 A1* | 1/2012 | Rub | 707/813 |
| 2012/0131381 A1 | 5/2012 | Eleftheriou et al. | |
| 2012/0267689 A1 | 10/2012 | Chen et al. | |

OTHER PUBLICATIONS

U.S. Appl. No. 13/247,532, filed Sep. 28, 2011, entitled "Smart Bridge for Memory Core," 53 pages.

U.S. Appl. No. 13/247,592, filed Sep. 28, 2011, entitled "Smart Bridge for Memory Core," 52 pages.

U.S. Appl. No. 13/247,635, filed Sep. 28, 2011, entitled "Smart Bridge for Memory Core," 53 pages.

International Search Report and Written Opinion of the International Searching Authority (EPO) for International Application No. PCT/US2012/043465, mailed Sep. 27, 2012, 12 pages.

Non-Final Office Action mailed Sep. 9, 2013 in U.S. Appl. No. 13/247,635, 19 pages.

Restriction Requirement mailed Feb. 26, 2014 in U.S. Appl. No. 13/247,532, 6 pages.

Restriction Requirement mailed Mar. 11, 2014 in U.S. Appl. No. 13/247,592, 6 pages.

International Preliminary Report on Patentability for International Application No. PCT/US2012/043465, issued Jan. 7, 2014, 7 pages.

Notice of Allowance and Fee(s) Due mailed Jan. 13, 2014 in U.S. Appl. No. 13/247,635, 10 pages.

Notice of Allowance and Fee(s) Due mailed Jul. 29, 2014 in U.S. Appl. No. 13/247,635, 9 pages.

D'Abreu, Manuel Antonio et al. "Smart Bridge for Memory Core," U.S. Appl. No. 14/246,548, filed Apr. 7, 2014, 48 pages.

D'Abreu, Manuel Antonio et al. "Smart Bridge for Memory Core," U.S. Appl. No. 14/246,593, filed Apr. 7, 2014, 48 pages.

D'Abreu, Manuel Antonio et al. "Smart Bridge for Memory Core," U.S. Appl. No. 14/246,650, filed Apr. 7, 2014, 49 pages.

D'Abreu, Manuel Antonio et al. "Smart Bridge for Memory Core," U.S. Appl. No. 14/246,680, filed Apr. 7, 2014, 49 pages.

Non-Final Office Action mailed Jun. 13, 2014 in U.S. Appl. No. 13/246,548, 13 pages.

Non-Final Office Action mailed Jun. 16, 2014 in U.S. Appl. No. 13/246,680, 13 pages.

Non-Final Office Action mailed Jun. 19, 2014 in U.S. Appl. No. 13/246,593, 9 pages.

Non-Final Office Action mailed Jun. 19, 2014 in U.S. Appl. No. 13/246,650, 12 pages.

International Preliminary Report on Patentability for International Application No. PCT/US2012/065334, issued Jun. 24, 2014, 7 pages.

Notice of Allowance and Fee(s) Due mailed Apr. 18, 2014 in U.S. Appl. No. 13/247,635, 9 pages.

Non-Final Office Action mailed May 8, 2014 in U.S. Appl. No. 13/247,532, 14 pages.

Non-Final Office Action mailed May 9, 2014 in U.S. Appl. No. 13/247,592, 15 pages.

Final Office Action mailed Jan. 14, 2015 in U.S. Appl. No. 14/246,593, 10 pages.

Notice of Allowance and Fee(s) Due mailed Jan. 22, 2015 in U.S. Appl. No. 14/246,680, 11 pages.

Final Office Action mailed Dec. 29, 2014 in U.S. Appl. No. 14/246,548, 15 pages.

Final Office Action mailed Dec. 19, 2014 in U.S. Appl. No. 13/247,532, 16 pages.

Final Office Action mailed Dec. 22, 2014 in U.S. Appl. No. 13/247,592, 16 pages.

Notice of Allowance and Fee(s) Due mailed Dec. 3, 2014 in U.S. Appl. No. 14/246,650, 9 pages.

Notice of Allowance and Fee(s) Due mailed Nov. 5, 2014 in U.S. Appl. No. 13/247,635, 9 pages.

Loh, "3D-Stacked Memory Architectures for Multi-Core Processors", 35th International Symposium on Computer Architecture, Beijing, Jun. 21-25, 2008, IEEE Computer Society, pp. 453-464.

Notice of Allowance and Fee(s) Due mailed Apr. 14, 2015 in U.S. Appl. No. 14/246,593, 10 pages.

Notice of Allowance and Fee(s) Due mailed May 19, 2015 in U.S. Appl. No. 14/246,548, 10 pages.

Notice of Allowance and Fee(s) Due mailed May 12, 2015 in U.S. Appl. No. 14/246,680, 11 pages.

Non-Final Rejection mailed Jun. 19, 2014 in U.S. Appl. No. 14/246,650, 12 pages.

Notice of Allowance and Fee(s) Due mailed Mar. 31, 2015 in U.S. Appl. No. 14/246,650, 8 pages.

Notice of Allowance and Fee(s) Due mailed Mar. 10, 2015 in U.S. Appl. No. 13/247,635, 9 pages.

Notice of Allowance and Fee(s) Due mailed Jul. 2, 2015 in U.S. Appl. No. 13/247,592, 7 pages.

Notice of Allowance and Fee(s) Due mailed Jul. 9, 2015 U.S. Appl. No. 14/246,650, 8 pages.

Non-Final Office Action mailed Jul. 7, 2015 in U.S. Appl. No. 13/247,532, 9 pages.

Notice of Allowance and Fee(s) Due mailed Jun. 26, 2015 in U.S. Appl. No. 13/247,635, 9 pages.

* cited by examiner

WEAR LEVELING OF MULTIPLE MEMORY DEVICES

FIELD OF THE DISCLOSURE

The present disclosure is generally related to data storage.

BACKGROUND

The capability to store data in memory devices improves with advances in technology. For example, a flash memory device may enable non-volatile storage of data at a semiconductor device that may include one or more memory cores, and each core may be located on a corresponding memory die.

Wear of a memory element of a memory die may occur due to writes, reads, erases, and other memory operations involving the memory element. When a memory element experiences excessive wear, it may cease to be a reliable storage element. As the number of reliable storage elements in a memory die decreases, an error rate of data read from the memory die increases. When the error rate exceeds an error correction capability of a memory device, a useful life of the memory device is considered to have ended.

Wear leveling is a technique that may prolong the life of a memory die and typically includes transferring data between memory elements of the memory die so as to distribute wear among memory elements within the memory die. By moving data that is frequently accessed from one memory element to another, memory operations including reads, writes, erases, refreshes, and other memory operations are distributed among more than one memory element. As a result, the memory die may have a longer useful life than without wear leveling.

SUMMARY

Data may be transferred between different memory dies of a data storage device. A decision on whether to transfer data from one memory die to another may be based on reliability measurements associated one or both of the memory dies. By transferring data (wear leveling) to other nonvolatile dies of a plurality of memory dies within a data storage device, the useful life of the plurality of memory dies may be extended as compared with limiting wear leveling to data transfer within a single memory die.

Methods and devices are presented to maintain a reliability measurement associated with a first portion of a first nonvolatile memory die within a plurality of memory dies and to determine whether the reliability measurement satisfies a threshold. The threshold may be associated with a reliability of the first portion of the first nonvolatile memory die. In response to determining that the reliability measurement satisfies the threshold, data stored in the first portion may be transferred to a second nonvolatile memory die of the plurality of memory dies. The transfer of the data to a particular portion of the second nonvolatile memory die may be conditioned on a reliability measurement associated with the particular portion having a value that is less than a threshold that is associated with the particular portion of the second nonvolatile memory die.

DETAILED DESCRIPTION

Data may be stored within a portion of a nonvolatile memory, such as a page or a block of the nonvolatile memory. Each portion of the nonvolatile memory may have experienced wear, typically resulting from numerous writes, reads, other memory operations, or a combination thereof.

The wear associated with a portion of the nonvolatile memory may be reflected in a reliability measurement associated with the portion. For example, the reliability measurement may be determined based on a count of writes, reads, other memory accesses, or any combination thereof with respect to the portion. Alternatively, the reliability measurement may be based on elapsed time since data was written to the portion. The reliability measurement may provide an indication as to a reliability of the portion, i.e., whether a data representation stored in the portion is an accurate representation of the data that was written to the portion.

A reliability measurement may be assessed by comparing its value with a threshold that is associated with a reliability standard. When a reliability measurement associated with a first portion of the memory reaches or exceeds a threshold, the first portion may be deemed unreliable. In response, the stored data may be transferred to a second portion of the nonvolatile memory. Transferring the data to the second portion to even out wear (i.e., wear leveling) may increase the reliability of the stored data. To illustrate, transferring the data to the second portion may reduce a probability of errors occurring in the stored data as compared to retaining the data in the first portion.

Wear leveling may be limited to transfer of data from one portion of a memory die to another portion of the memory die. Alternatively, wear leveling may be extended to transfer data between memory dies. When wear leveling is limited to moving data from one portion of a die to another portion of the same die, one of the dies may wear faster than the other dies. Disproportionate wear on a single memory die may limit the effective life of a memory device that includes a plurality of memory dies, such as a stack of memory dies, due to difficulties of replacing a single die within the stack. By applying wear leveling to data transfer across multiple memory dies, the likelihood of disproportionate wear on any one of the memory dies may be reduced, thus extending the overall useful life of the memory device.

Figure 1:
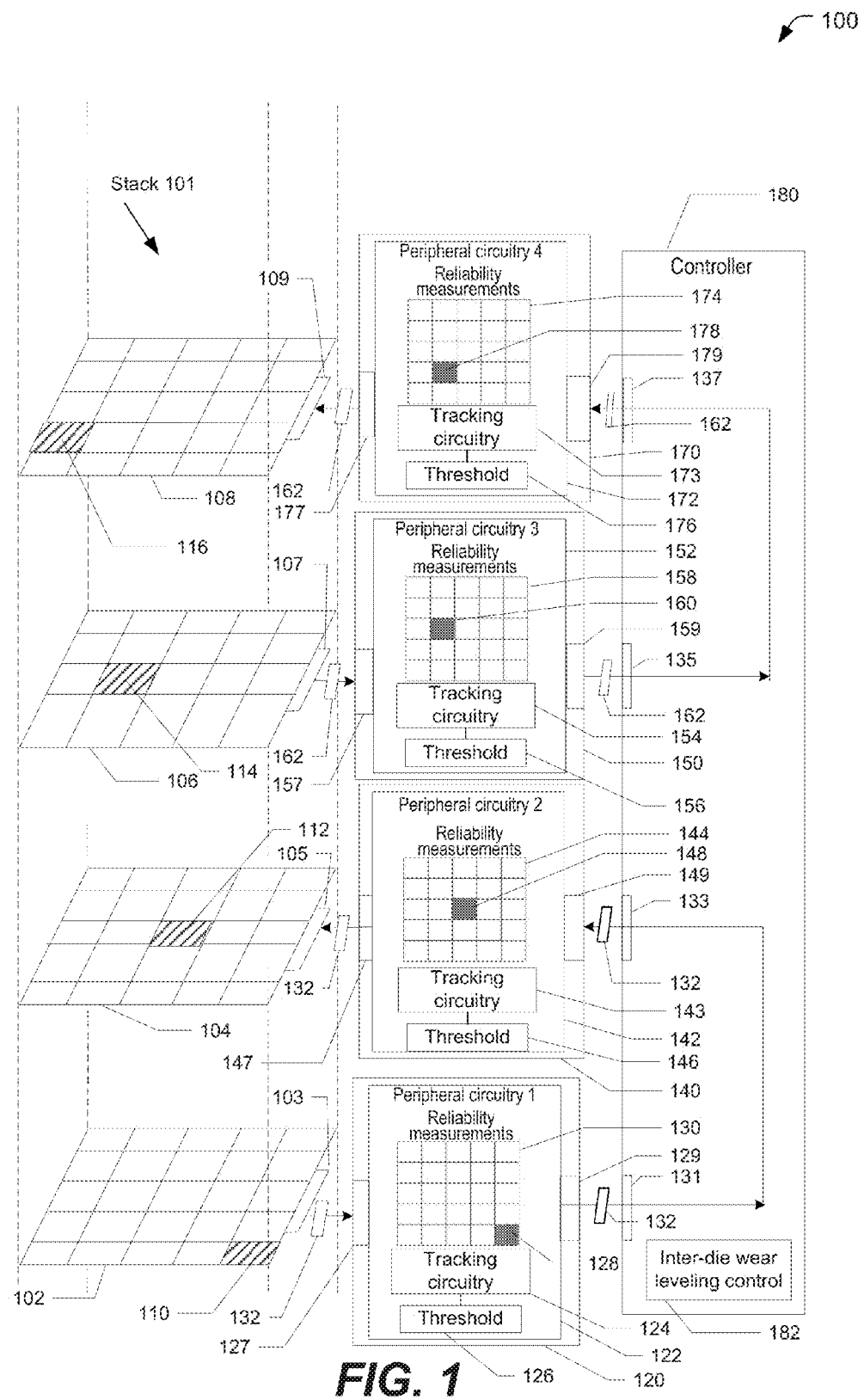
FIG. 1 is a block diagram that illustrates a particular embodiment of a data storage device that includes peripheral circuitry configured to transfer data between memory dies of a plurality of memory dies.

FIG. 1 is a block diagram of a data storage device 100 that includes a stack 101 of memory dies and a controller 180 configured to perform wear leveling by transferring data between memory dies of the stack 101. The data storage device 100 also includes a first peripheral die 120, a second peripheral die 140, a third peripheral die 150, and a fourth peripheral die 170. Each of the peripheral dies 120, 140, 150, and 170 is coupled to a respective memory die of the stack 101 of memory dies. In other embodiments, the data storage device 100 may include multiple dies that are not stacked and are arranged in another geometric configuration, e.g., a multi-die package having memory dies arranged side by side, or arranged in several stacks of equal or varying numbers of dies, etc. The description of FIG. 1 herein applies with any geometric configuration of multiple memory dies of the data storage device 100.

The data storage device 100 may be included in a memory card, such as a Secure Digital SD® card, a microSD® card, a miniSD™ card (trademarks of SD-3C LLC, Wilmington, Del.), a MultiMediaCard™ (MMC™) card (trademark of JEDEC Solid State Technology Association, Arlington, Va.), or a CompactFlash® (CF) card (trademark of SanDisk Corporation, Milpitas, Calif.). Alternatively, the data storage device 100 may be embedded memory in a host device, such as an eMMC® (trademark of JEDEC Solid State Technology Association, Arlington, Va.) memory or eSD memory, as illustrative examples. In another alternative, the data storage device 100 may be embedded memory (e.g., embedded flash dies) that may be utilized in cellular phones, computing devices including tablets, portable computers, personal digital assistants, etc.

The stack 101 includes a first memory die 102 that includes a peripheral circuitry interface 103, a second memory die 104 that includes a peripheral circuitry interface 105, a third memory die 106 that includes a peripheral circuitry interface 107, and a fourth memory die 108 that includes a peripheral circuitry interface 109. One or more of the memory dies of the stack 101 may include a flash memory, such as a NAND flash memory. Although the stack 101 is illustrated as having four memory dies, in other embodiments the stack 101 may have two memory dies, three memory dies, or more than four memory dies.

The first memory die 102 may be coupled to first peripheral circuitry 122 of the peripheral die 120 via the peripheral circuitry interface 103 and via a core interface 127 of the first peripheral die 120. The second memory die 104 may be coupled to second peripheral circuitry 142 of the second peripheral die 140 via the peripheral circuitry interface 105 and via a core interface 147 of the second peripheral die 140. The third memory die 106 may be coupled to third peripheral circuitry 152 of the third peripheral die 150 via the peripheral circuitry interface 107 and via a core interface 157 of the third peripheral die 150. The fourth memory die 108 may be coupled to fourth peripheral circuitry 172 of the fourth peripheral die 170 via the peripheral circuitry interface 109 and via a core interface 177 of the fourth peripheral die 170.

The first peripheral circuitry 122 may be coupled to the controller 180 via a controller interface 129 of the first peripheral die 120 and via a first device interface 131 of the controller 180. The second peripheral circuitry 142 may be coupled to the controller 180 via a controller interface 149 of the second peripheral die 140 and via a second device interface 133 of the controller 180. The third peripheral circuitry 152 may be coupled to the controller 180 via a controller interface 159 of the third peripheral die 150 and via a third device interface 135 of the controller 180. The fourth peripheral circuitry 172 may be coupled to the controller 180 via a controller interface 179 of the fourth peripheral die 170 and via a fourth device interface 137 of the controller 180. One or more of the device interfaces 131, 133, 135, and 137 may be a serializer/deserializer (SERDES) interface.

The first peripheral circuitry 122 may be configured to communicate with the first nonvolatile memory die 102 via the core interface 127 and to communicate with the controller 180 via the controller interface 129. For example, the controller interface 129 may be a SERDES interface that enables communication with the controller 180 via differential signaling over a pair of lines. The first peripheral circuitry 122 may be configured to perform one or more operations traditionally implemented by a controller (such as error correction coding and decoding) or by a flash memory (such as data latching and state machine operations).

The first peripheral circuitry 122 includes tracking circuitry 124 that is configured to update a reliability measurements table 130 in response to memory operations that occur at the first memory die 102. For example, the tracking circuitry 124 may be configured to update a count of write/erase cycles in the reliability measurements table 130 corresponding to data being written to the memory die 102. The tracking circuitry 124 may also be configured to compare entries in the reliability measurements table 130 to a threshold 126 and to signal the controller 180 when a particular entry satisfies the threshold 126.

Similarly, the second peripheral circuitry 142 may be configured to communicate with the second nonvolatile memory die 104 and may include tracking circuitry 143. The second peripheral circuitry 142 may store a threshold 146 and a reliability measurements table 144. The third peripheral circuitry 152 may be configured to communicate with the third nonvolatile memory die 106 and may include tracking circuitry 154. The third peripheral circuitry 152 may store a threshold 156 and a reliability measurements table 158. The fourth peripheral circuitry 172 may be configured to communicate with the fourth nonvolatile memory die 108 and may include tracking circuitry 173. The fourth peripheral circuitry 142 may store a threshold 176 and a reliability measurements table 174. One or more of the reliability measurements tables 130, 144, 158, and 174 and/or one or more of the thresholds 126, 146, 156, and 176 may be stored in onboard memory, such as in nonvolatile storage within the corresponding peripheral circuitry.

In operation, the controller 180 may control data operations that occur at the stack 101, such as write, read, and erase operations. For example, the controller 180 may send a write command and data to the peripheral die 120, and the peripheral die 120 may store the data in the first memory die 102. Data may be stored in any portion of the first memory die 102. (A "portion" may refer to a page of memory, a block of memory, or another division of memory on a memory die.) For example, data 132 may be stored in a first portion 110 of the first memory die 102. The tracking circuitry 124, maintaining a reliability measurement 128 associated with the first portion 110, may update the reliability measurement 128 in the table 130.

The tracking circuitry 124 may maintain, within the reliability measurements table 130, a corresponding reliability measurement for each portion of the first memory die 102. By maintaining the reliability measurements within the reliability measurements table 130, the first peripheral circuitry 122 may detect when data transfer between memory dies should be performed. For example, the first peripheral circuitry 122 may detect that one or more reliability measurements in the reliability measurements table 130 satisfies or exceeds the threshold 126.

The first peripheral circuitry 122 may determine that the reliability measurement 128 satisfies the threshold 126 (i.e., equals or exceeds the threshold 126). In response, the first peripheral circuitry 122 may initiate a transfer of the data 132 to another memory die. For example, the first peripheral circuitry 122 may send a signal to an inter-die wear leveling control 182 within the controller 180 indicating that the data 132 stored at the first portion 110 should be moved.

The inter-die wear leveling control 182 may query one or more of the tracking circuitry 143, 154, and 173 to locate a destination location for the data 132. In response to the query, each of the tracking circuitry 143, 154, and 173 may send a reply to the inter-die wear leveling control 182 indicating a condition of the corresponding memory die for data transfer.

The inter-die wear leveling control 182 may select a destination location on the second memory die 104 for the data 132 and may instruct the first peripheral circuitry 122 to retrieve the data 132. For example, the inter-die wear leveling control 182 may select a second portion 112 as a transfer destination conditioned on establishing that a second reliability measurement 148 associated with the second portion 112 of the second nonvolatile memory die 104 is less than the threshold 146 associated with the second memory die 104. A determination of whether the second reliability measurement 148 is less than the threshold 146 may be carried out by the second peripheral circuitry 142.

The inter-die wear leveling control 182 of the controller 180 may direct the transfer of the data 132 from the controller 180 to the second portion 112 of the second peripheral circuitry 142. The second peripheral circuitry 142 may store the data 132 to the second memory die 104.

In another example, second data 162 may be moved from a third portion 114 of the third memory die 106 to be stored in the fourth memory die 108. For example, a determination may be made that a reliability measurement 160 associated with the third portion 114 satisfies the threshold 156. The inter-die wear leveling control 182 may select a destination location, such as a portion 116 on the fourth memory die 104, and may instruct the third peripheral circuitry 122 to retrieve the data 162. Transfer of the second data 162 to the fourth portion 116 may be conditioned on a determination that a reliability measurement 178 that is associated with the fourth portion 116 is less than the threshold 176.

The reliability measurements maintained in the reliability measurement tables 130, 144, 158, and 174 may track memory access operations, such as read, write, or other memory operation to the corresponding portion of a memory die in the stack 101. Alternatively or in addition, the reliability measurement may enable determination of an elapsed time since data was written to a particular portion of a memory die. For example, the tracking circuitry 124 may record a time stamp of when the data 132 was written to the portion 110 and may compare the time stamp to a system clock to calculate the elapsed time. The tracking circuitry 124 may determine whether the elapsed time has exceeded a threshold, such as the threshold 126.

Each threshold, such as the thresholds 126, 146, 156, and 176, may be selected based upon one or more criteria, such as ambient conditions of the corresponding memory die. For example, operating temperature may affect the reliability of a memory die, and a memory die may operate at a higher temperature in an interior position of the stack 101 than in an outer position of the stack 101. Because higher ambient temperatures may cause more rapid degradation of stored data, a threshold value for an interior-positioned memory die (e.g. the second memory die 104 or the third memory die 106) may be smaller than for an outer-positioned memory die (e.g. the first memory die 102 or the fourth memory die 108). A smaller threshold value may reflect a shorter useful life of a memory die and may result in transferring data after fewer memory operations or after less time has elapsed since writing the data.

By performing inter-die wear leveling, the device 100 may have a longer useful life as compared to only performing wear leveling within each die individually. Data may be transferred from dies experiencing more wear to dies that are experiencing less wear. As a result, premature failure of the device 100 due to excessive wear occurring at a single memory die may be reduced.

Figure 2:
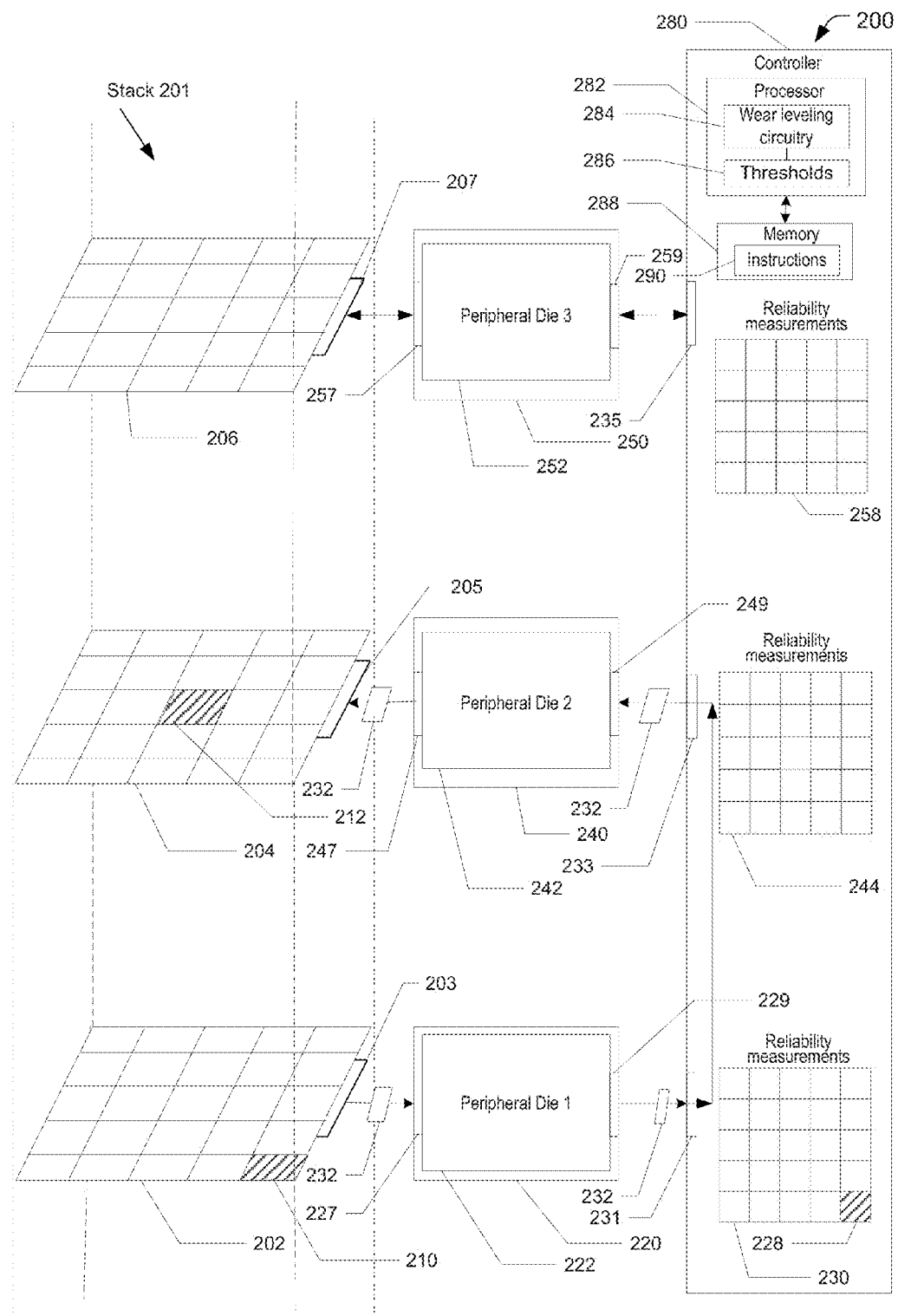
FIG. 2 is a block diagram that illustrates a particular embodiment of a data storage device that includes peripheral circuitry and a controller configured to transfer data between memory dies of a plurality of memory dies.

FIG. 2 is a block diagram of a data storage device 200 that includes peripheral circuitry and a controller configured to transfer data between memory dies of a plurality of memory dies. The data storage device 200 includes a stack of memory dies 201, a controller 280, and a plurality of peripheral dies 220, 240, and 250. Each of the memory dies in the stack 201 may be a nonvolatile memory die, such as a NAND flash memory. In other embodiments, the data storage device 200 includes multiple dies that are not stacked and are arranged in another geometric configuration, e.g., side by side, or in several stacks of equal or varying numbers of dies, etc. The description of FIG. 2 herein applies with any geometric configuration of multiple dies of the data storage device 200.

The memory stack 201 may include a first memory die 202 that includes a peripheral circuitry interface 203, a second memory die 204 that includes a peripheral circuitry interface 205, and a third memory die 206 that includes a peripheral circuitry interface 207. Although the stack 201 is illustrated as having three memory dies, in other embodiments the stack 201 may have two memory dies or more than three memory dies.

The first memory die 202 may be coupled to first peripheral circuitry 222 of the first peripheral die 220 via the first peripheral circuitry interface 203 and via a core interface 227 of the first peripheral die 220. The second memory die 204 may be coupled to second peripheral circuitry 242 of the second peripheral die 240 via the second peripheral interface 205 and via a core interface 247 of the second peripheral die 240. The third memory die 206 may be coupled to third peripheral circuitry 252 of the third peripheral die 250 via the third peripheral interface 207 and via a core interface 257 of the third peripheral die 250.

The first peripheral circuitry 222 may be coupled to the controller 280 via a controller interface 229 of the first peripheral die 120 and via a first device interface 231 of the controller 280. The second peripheral circuitry 242 may be coupled to the controller 280 via a controller interface 249 of the second peripheral die 240 and via a second device interface 233 of the controller 280. The third peripheral circuitry 252 may be coupled to the controller 280 via a controller interface 259 of the third peripheral die 250 and via a third device interface 235 of the controller 280. One or more of the device interfaces 231, 233, and 235 may be a serializer/deserializer (SERDES) interface.

The controller 280 may include a processor 282 that may include wear leveling circuitry 284. The controller 280 may also include threshold storage 286 storing one or more thresholds. The controller 280 may also include a memory 288 that may include instructions 290 that, when executed by the processor 282, cause the processor 282 to perform operations such as generating and updating reliability measurements for each die in the stack 201. The controller 280 may include reliability measurement tables 230, 244, and 258 corresponding to the memory dies 202, 204, and 206, respectively.

The processor 282 may be configured to identify one or more portions of a memory die, such as the first memory die 202, whose reliability measurement satisfies a corresponding threshold. The wear leveling circuitry 284 may be configured to initiate transfer of data from each identified portion having reliability measurements satisfying the corresponding threshold, to a corresponding distinct portion of another memory die of the stack of memory dies 201. The data may be written to another portion conditioned on a reliability measurement corresponding to the other portion having a value that is less than a corresponding threshold.

In operation, the controller 280 may store a reliability measurement associated with each of a plurality of portions of the memory die 202. For example, the controller 280 may store a reliability measurement 228 associated with a first portion 210 in the reliability measurements table 230. The controller 280 may maintain the reliability measurement 228 by updating the value of the reliability measurement 228 each time an event associated with the first portion 210 occurs, such as a read of the portion 210, a write to the portion 210, another memory operation associated with the portion 210, or any combination thereof. Alternatively, each reliability measurement may be updated based on a time elapsed since writing data to the first portion 210.

The processor 282 may perform a comparison of a threshold stored at the threshold storage 286 to the reliability measurement 228. The processor 282 may determine that the reliability measurement 228 satisfies the threshold and in response, the wear leveling circuitry 284 may transfer data 232 stored at the first portion 210 to the second memory die 204 via the first peripheral circuitry 222 and the second peripheral circuitry 242. The data 232 may be written to a portion 212 of the second memory die 204 conditioned on a reliability measurement corresponding to the portion 212 having a value that is less than a threshold, such as a threshold that is associated with the portion 212 or with the second memory die 204.

The controller 280 may maintain multiple reliability measurements, each reliability measurement associated with a corresponding portion of a memory die. Each reliability measurement may be associated with a count of memory reads, writes, other memory operations, or a combination thereof, related to the corresponding portion of a nonvolatile memory die. Each of the multiple reliability measurements may be maintained in the controller 280 by updating the reliability measurement after each instance of a memory access, write, or other memory operation to the corresponding portion of the stack 201 of memory dies. Alternatively, or in addition, each reliability measurement may be associated with a time that has elapsed since writing to a portion of a memory die and may be updated based upon the elapsed time.

Figure 3:
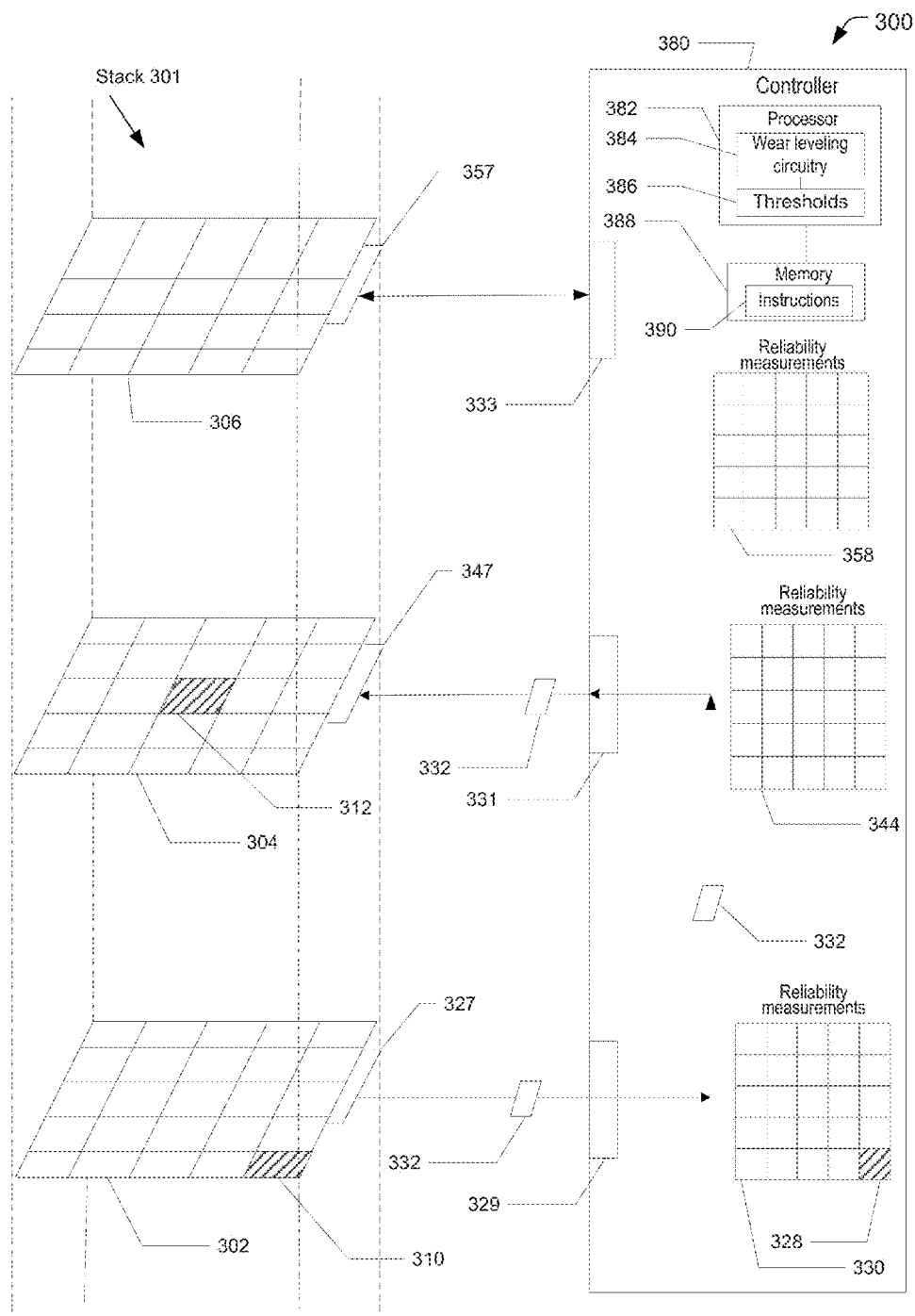
FIG. 3 is a block diagram that illustrates a particular embodiment of a data storage device that includes a controller configured to transfer data between memory dies of a plurality of memory dies.

FIG. 3 is a block diagram of a data storage device 300 that includes a stack 301 of memory dies and a controller 380 configured to transfer data between memory dies of the stack 301.

The stack 301 includes a first memory die 302 including a first controller interface 327, a second memory die 304 including a second controller interface 347, and a third memory die 306 including a third controller interface 357. One or more of the memory dies of the stack 301 may include a flash memory, such as a NAND flash memory. Although the stack 301 is illustrated as having three memory dies, in other embodiments the stack 301 may have two memory dies or more than three memory dies. In other embodiments, the data storage device 300 includes multiple dies that are not stacked and are arranged in another geometric configuration, e.g., side by side, or in several stacks of equal or varying numbers of dies, etc. The description of FIG. 3 herein applies to any geometric configuration of the memory dies, e.g., memory dies 302, 304, and 306.

The first memory die 302 may be coupled to the controller 380 via the first controller interface 327 and via a first memory interface 329 of the controller 380. The second memory die 304 may be coupled to the controller 380 via the second controller interface 347 and via a second memory interface 331 of the controller 380. The third memory die 306 may be coupled to the controller 380 via the third controller interface 357 and via a third memory interface 333 of the controller 380.

The controller 380 may include a first reliability measurements table 330 corresponding to the first memory die 302, a second reliability measurements table 344 corresponding to the second memory die 304, and a third reliability measurements table 358 corresponding to the third memory die 306. The controller 380 may also include a processor 382 that may include wear leveling circuitry 384, threshold storage 386, and a memory 388 including instructions 390 to be executed by the processor 382. The memory 388 may be a nonvolatile memory within the controller 380. Alternatively, the memory 388 may be a volatile memory that may receive the instructions 390 upon startup.

The controller 380 may be configured to maintain a reliability measurement associated with each of one or more portions of a memory die, such as a reliability measurement 328 associated with the first portion 310 of the first memory die 302. The controller 380 may maintain the reliability measurement 328 by updating the value at each instance of a read of the portion 310, a write to the portion 310, another memory operation directed to the first portion 310, or any combination thereof. Alternatively, the reliability measurement 328 may correspond to a time that has elapsed since a write time to the portion 310 and may be updated based on the elapsed time.

In operation, the processor 382 may maintain the reliability measurements and a determination may be made of whether an updated reliability measurement satisfies a corresponding threshold. In response to a determination that a reliability measurement associated with a portion satisfies a corresponding threshold stored at the threshold storage 386, the controller 380 may transfer data stored at the portion to another memory die. For example, upon determining that the reliability measurement 328 satisfies a corresponding threshold, the wear leveling circuitry 384 of the controller 380 may initiate a transfer of data 332 from the first portion 310 to a second portion 312 of the second memory die 304 via the controller 380. Transfer of the data 332 to the second portion 312 of the second memory die 304 may be conditioned upon a determination that a reliability measurement associated with the portion 312 has a value less than a corresponding threshold associated with the second portion 312.

Figure 4:
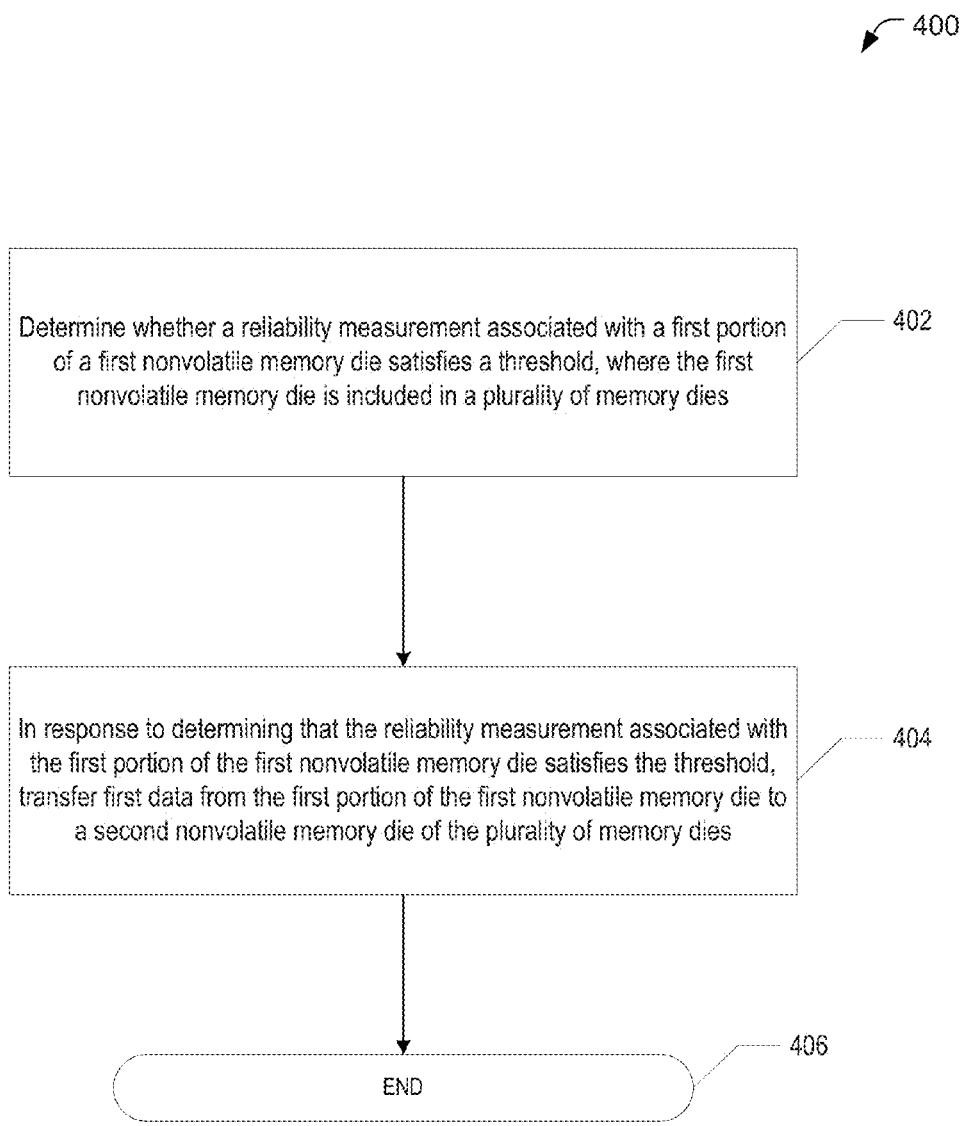
FIG. 4 is a flow chart that illustrates a particular embodiment of a method of managing wear leveling in a data storage device.

FIG. 4 is a flow chart of a method of managing wear leveling in a data storage device, such as the data storage device of FIG. 1, 2, or 3. A determination may be made of whether a reliability measurement associated with a first portion of a first nonvolatile memory die included in a plurality of memory dies, such as a stack of memory dies, satisfies a threshold, at 402. For example, a determination may be made as to whether the reliability measurement 128 of FIG. 1 satisfies the threshold 126.

In response to determining that the reliability measurement associated with the first portion of the first nonvolatile memory die satisfies the threshold, first data may be transferred from the first portion of the first nonvolatile memory die to a second nonvolatile memory die of the plurality of memory dies, at 404. For example, in FIG. 1, in response to the reliability measurement 128 satisfying the threshold 126, the data 132 may be transferred from the portion 110 of the first memory die 102 to the second memory die 104. The method ends at 406.

The first data may be transferred from the first portion of the first nonvolatile memory die to the second nonvolatile memory die via first peripheral circuitry that is configured to communicate with the first nonvolatile memory die. For example, the data 132 of FIG. 1 may be retrieved from the portion 110 of the first memory die 102 via the first peripheral circuitry 122. The first data may be transferred to the second nonvolatile memory die via second peripheral circuitry that is configured to communicate with the second nonvolatile memory die. For example, the data 132 of FIG. 1 may be transferred to the second memory die 104 via the peripheral circuitry 142.

The method 400 may further include determining that a reliability measurement associated with a particular portion of a third nonvolatile memory die of the plurality of memory dies satisfies a corresponding threshold and in response to the determination, transferring second data stored in the particular portion to a fourth nonvolatile memory die of the plurality of memory dies. For example, in FIG. 1 the reliability measurement 160 associated with the portion 114 of the third memory die 106 may be determined to satisfy the threshold 156. In response, the data 162 stored in the portion 114 may be transferred to the fourth memory die 108 (or, e.g., to another memory die of the stack 101 of memory dies). The second data may be transferred via third peripheral circuitry that is configured to communicate with the third nonvolatile memory die. For example, in FIG. 1 the data 162 may be transferred via the peripheral circuitry 152 that is configured to communicate with the third memory die 106.

The second data may be transferred to the fourth nonvolatile memory die via fourth peripheral circuitry that is configured to receive the second data from the third peripheral circuitry (e.g. the peripheral circuitry 152 of FIG. 1) and to communicate the second data to the fourth nonvolatile memory die. For example, in FIG. 1, the data 162 may be transferred to the fourth memory die 108 via the peripheral circuitry 172 that is configured to receive the data 162 from the peripheral circuitry 152 via the controller 180 and to communicate the data 162 to the fourth memory die 108.

The method 400 may include maintaining a corresponding reliability measurement associated with each portion of a plurality of portions of the first nonvolatile memory die. The method 400 may also include maintaining a corresponding reliability measurement associated with each portion of each nonvolatile memory die of the plurality of memory dies. For example, in FIG. 1 each of the peripheral circuitry 122, 142, 152, and 172 may maintain, via corresponding tracking circuitry 124, 143, 154, and 173, corresponding reliability measurements associated with each portion of the corresponding memory dies 102, 104, 106, and 108. Data may be transferred to a particular portion of a memory die, such as to the second nonvolatile memory die 104 or to another of the memory dies. e.g., memory die 106 or memory die 108, conditioned on determining that a corresponding reliability measurement associated with the particular portion of the second nonvolatile memory die is less than the threshold.

In response to a determination that the reliability measurement associated with the particular portion of the second nonvolatile memory die satisfies the threshold, the method may include seeking another particular portion having an associated reliability measurement that is less than the threshold. In response to locating the other particular portion having the associated reliability measurement that is less than the threshold, data may be transferred to the other particular portion.

For each portion of a plurality of portions of each nonvolatile memory die, a corresponding reliability measurement may be maintained by the controller. The controller may be coupled to each of the plurality of memory dies via corresponding peripheral circuitry that includes first peripheral circuitry coupled to the first memory die and second peripheral circuitry coupled to the second memory die. For example, in FIG. 2, the controller 280 may maintain reliability measurements of each portion of the memory dies 202, 204, and 206. The controller 280 is coupled to each of the memory dies 202, 204, and 206 by corresponding peripheral circuitry on peripheral dies 220, 240, and 250, respectively.

The reliability measurement associated with the first portion of the first nonvolatile die may be associated with a count of memory accesses to the first portion of the first nonvolatile memory die. For example, the reliability measurement associated with the first portion of the first nonvolatile die may be updated in response to each instance of memory access to the first portion of the first nonvolatile memory die.

The reliability measurement associated with the first portion of the first nonvolatile die may be associated with a count of write operations to the first portion of the first nonvolatile memory die. The reliability measurement associated with the first portion of the first nonvolatile die may be updated in response to each instance of write operation to the first portion of the first nonvolatile memory die. Alternatively, or in addition, the reliability measurement associated with the first portion of the first nonvolatile die may be associated with an elapsed time since writing the first data to the first portion of the first nonvolatile memory die.

Figure 5:
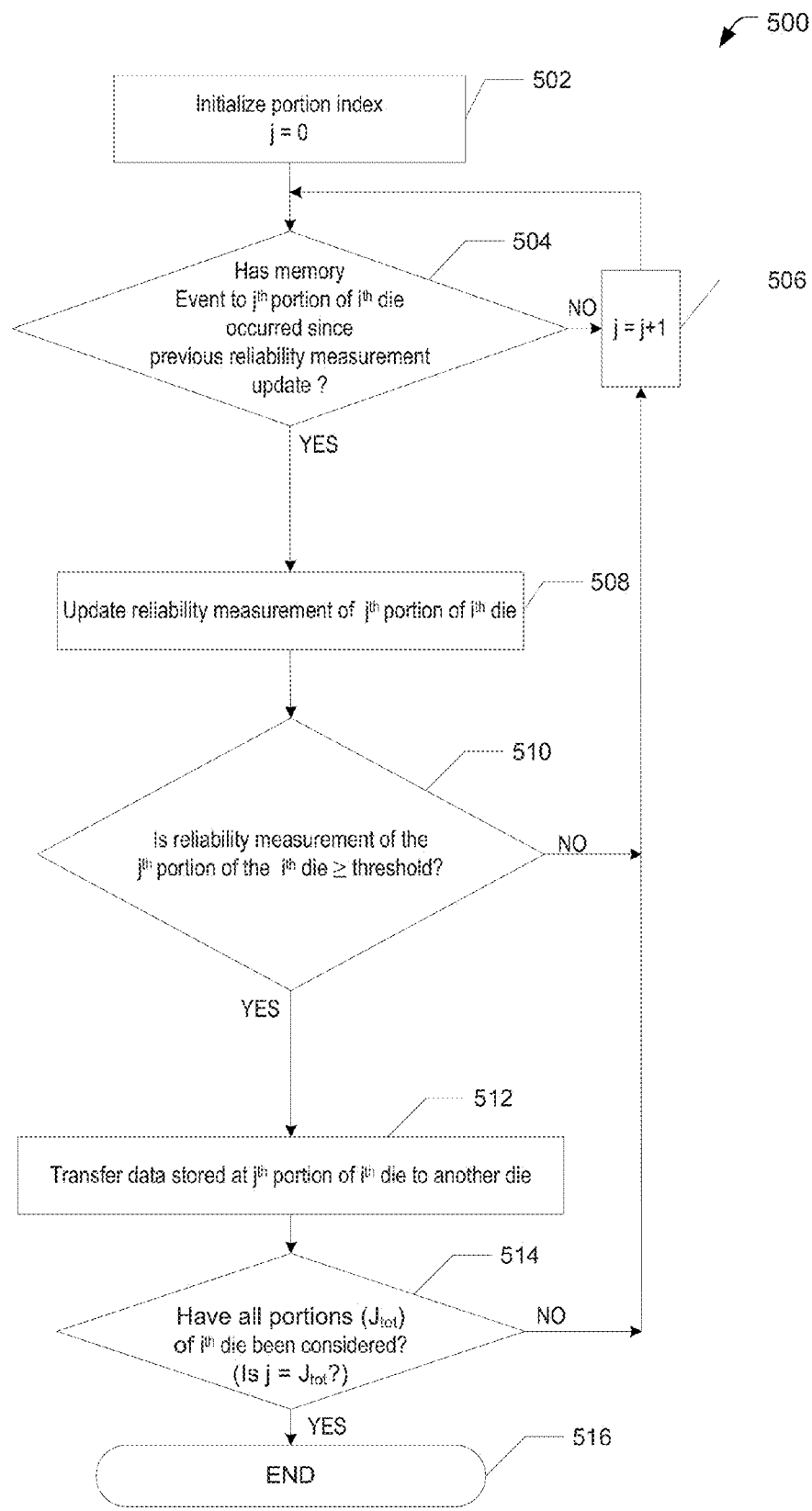
FIG. 5 is a flow chart that illustrates another embodiment of a method of managing wear leveling in a data storage device.

FIG. 5 depicts a method 500 of managing wear leveling in a data storage device having multiple memory dies, such as the data storage device of FIG. 1, 2, or 3. A portion index j is initialized to a value of 0, at 502. A determination is made as to whether a memory event associated with the $j^{th}$ portion of the $i^{th}$ die, such as a write to the $j^{th}$ portion or a read to the $j^{th}$ portion, has occurred since the previous reliability measurement update, at 504. In response to occurrence of a memory event associated with the $j^{th}$ portion of the $i^{th}$ die, the reliability measurement of the $j^{th}$ portion of the $i^{th}$ die is updated, at 508. For example, in FIG. 1 the tracking circuitry 124 may update a reliability measurement stored in the reliability measurements table 130 in response to a memory event that has occurred at a corresponding portion of the memory die 102. If a memory event associated with the $j^{th}$ portion of the $i^{th}$ die has not occurred since the previous reliability measurement update, the index j is incremented by 1 at 506, and the method returns to 504 to determine whether the j+1 portion has had a memory event since the previous reliability measurement update.

A determination is made as to whether the reliability measurement of the $j^{th}$ portion of the $i^{th}$ die satisfies (i.e., is greater than or equal to) a threshold, at 510. If the reliability measurement is greater than or equal to the corresponding threshold, data stored at the $j^{th}$ portion of the $i^{th}$ die is transferred to another die, at 512. If the reliability measurement of the $j^{th}$ portion of the $i^{th}$ die is less than the threshold, the index j is incremented, at 506, and the method returns to 504.

A determination is made as to whether all portions of the $i^{th}$ die have been considered, at 514. If all portions of the $i^{th}$ die (i.e., all j values) have been considered, the method ends, at 516. If all portions of the $i^{th}$ die have not been considered, the index j is incremented, and the method returns to 504.

Figure 6:
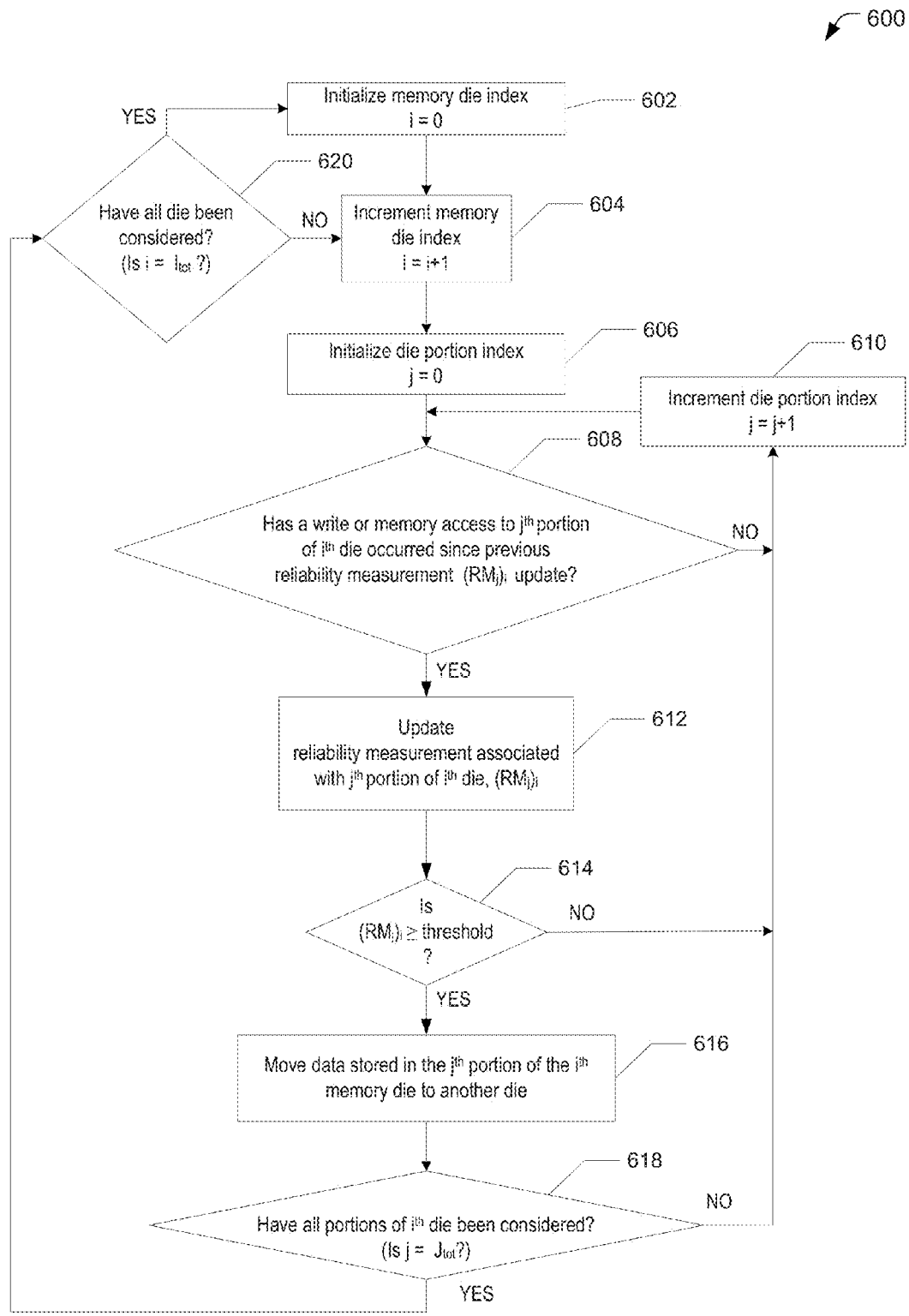
FIG. 6 is a flow chart that illustrates another embodiment of a method of managing wear leveling in a data storage device.

FIG. 6 depicts a method 600 of managing wear leveling in a data storage device, such as the data storage device of FIG. 1, 2, or 3. A memory die index is initialized to 0, at 602. The memory die index i, identifying a particular die, is increased by 1, at 604. A die portion index is initialized to a value of 0, at 606.

A determination as to whether a memory event to a $j^{th}$ portion of the $i^{th}$ die, i.e., a write, a memory access, another memory operation, or any combination thereof, to the $j^{th}$ portion of the $i^{th}$ die, has occurred since a previous reliability measurement update, at 608. If a write, a memory access, or another memory operation to the $j^{th}$ portion of the $i^{th}$ die has occurred since a previous reliability measurement update, a reliability measurement associated with the $j^{th}$ portion of the $i^{th}$ die is updated, at 612.

A determination is made as to whether a reliability measurement associated with the $j^{th}$ portion of the $i^{th}$ die satisfies (i.e., is greater than or equal to) an associated threshold, at 614. If the threshold is not satisfied, the method returns to increment the die portion index j, at 610, and proceeds to 608. If the reliability measurement satisfies the threshold, the data stored in the $j^{th}$ portion of the $i^{th}$ memory die is moved to another die, at 616. A determination is made whether all portions of the $i^{th}$ die have been considered, at 618. If not all portions of the $i^{th}$ die have been considered, the die portion index j is incremented, at 610, and the method returns to 608.

In response to all portions of the $i^{th}$ die having been considered, a determination is made as to whether each die has been considered (i.e., the index i is equal to $I_{tot}$), at 620. If not all dies of the plurality of memory dies have been considered, the method increments a memory die index i by 1, at 604, and proceeds to initialize the die portion index at 606. If all dies have been considered at 620, the method returns to 602.

Figure 7:
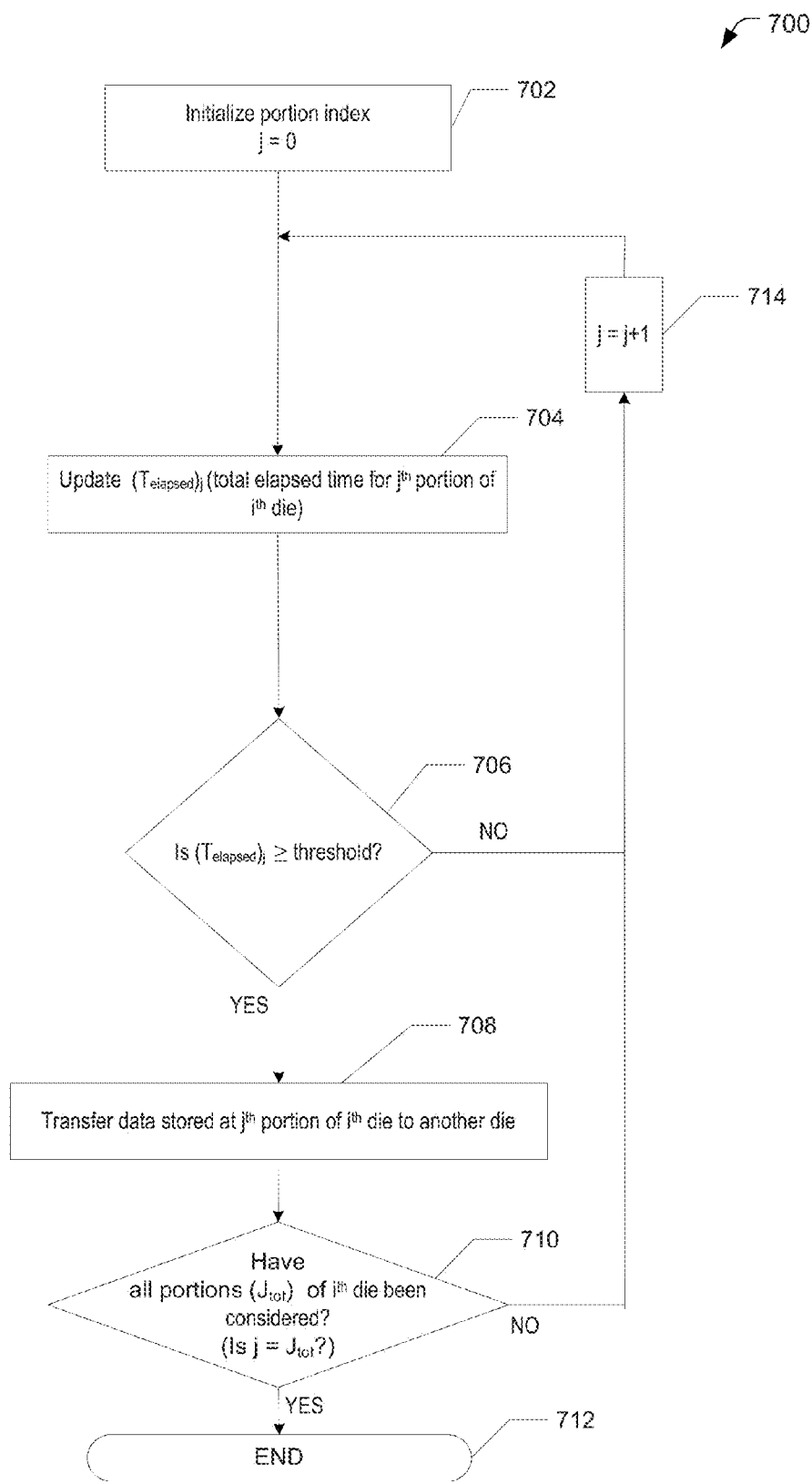
FIG. 7 is a flow chart that illustrates another embodiment of a method of managing wear leveling in a data storage device.

FIG. 7 depicts a method 700 of managing wear leveling in a data storage device, such as the data storage device of FIG. 1, 2, or 3. A portion index j is initialized to a value of 0, at 702. An elapsed time since writing data to the $j^{th}$ portion of the $i^{th}$ die is updated, at 704. A determination is made as to whether the elapsed time satisfies (i.e., is greater than or equal to) a threshold value, at 706. If the elapsed time is not greater than or equal to the threshold, j is incremented, at 714, and the elapsed time for the $j^{th}$ portion of the $i^{th}$ die is updated, at 704. If the elapsed time satisfies the threshold, the method proceeds to 708 and data stored at the $j^{th}$ portion of the $i^{th}$ die is transferred to another die, at 708.

A determination is made as to whether all portions of the $i^{th}$ die have been considered, at 710. If not all portions of the $i^{th}$ die have been considered, the method increments j, at 714, and returns to 704. If all portions of the $i^{th}$ die have been considered, the method ends, at 712.

Figure 8:
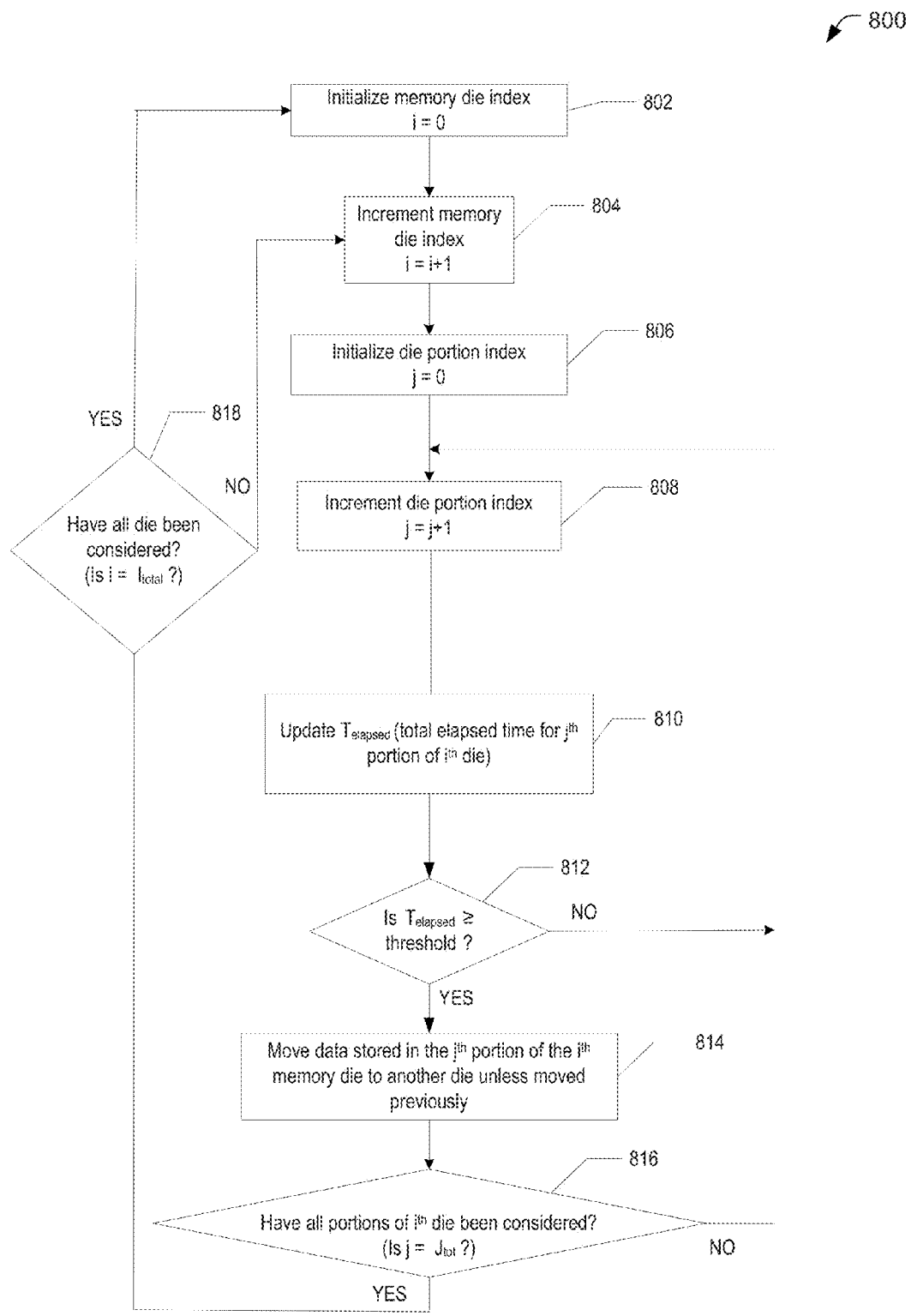
FIG. 8 is a flow chart that illustrates another embodiment of a method of managing wear leveling in a data storage device.

FIG. 8 depicts a method of managing wear leveling in a data storage device, such as the data storage device of FIG. 1, 2, or 3. The data storage device may include a plurality of memory dies, each memory die labeled with a memory die index i (i=0 to $I_{total}$). The memory die index i is initialized to 0, at 802. The memory die index i is incremented by 1, at 804. A die portion index j is initialized to 0, at 806, and incremented, at 808.

An elapsed time $T_{elapsed}$ associated with the $j^{th}$ portion of the $i^{th}$ die is updated, at 810. For example, the elapsed time $T_{elapsed}$ since the initial write of data to the $j^{th}$ portion of the $i^{th}$ die is updated. A determination is made as to whether the elapsed time $T_{elapsed}$ satisfies (e.g., is greater than or equal to) a threshold time, at 812. If the elapsed time $T_{elapsed}$ for the $j^{th}$ portion of the $i^{th}$ die does not satisfy the threshold, the index j is incremented, at 808.

In response to $T_{elapsed}$ satisfying the threshold, data stored at the $j^{th}$ portion of the $i^{th}$ memory die is moved to another die unless moved previously, at 814. A determination is made as to whether all portions of the $i^{th}$ die have been considered, at 816. If one or more portions of the $i^{th}$ die have not been considered, the die portion index j is incremented, at 808.

If, at 816, all portions of the $i^{th}$ die have been considered, the determination is made as to whether all dies have been considered, at 818. If one or more dies have not been considered, the memory die index is incremented by 1, at 804, and the die portion index j is initialized, at 806. If all dies have been considered, the memory die index i is initialized, at 802, and the method may repeat.

Although various components depicted herein are illustrated as block components and described in general terms, such components may include one or more microprocessors, state machines, or other circuits configured to enable the apparatus 100, 200, or 300 of FIG. 1, 2, or 3 to perform the particular functions attributed to such components or any combination thereof. For example, the inter-die wear leveling control 182 of FIG. 1 may include a physical component such as a hardware controller, a state machine, a logic circuit, or another structure to manage wear leveling in a data storage device and to transfer data from a memory die to another memory die of a memory stack.

Alternatively, or in addition, the data storage device 100 of FIG. 1 may include executable instructions (e.g., the instructions 290 of FIG. 2) that may be executed by the controller 180 to implement one or more functions of the inter-die wear leveling control 182, and the instructions may be stored in the stack 101 or in a random access memory. Alternatively, or in addition, executable instructions that are executed by the controller 180 may be stored at a separate memory that is not part of the stack 101, such as at a read-only memory (ROM).

Any of the data storage devices 100, 200, or 300 may be included in a portable device configured to be selectively coupled to one or more external devices. Alternatively, any of the data storage devices 100, 200, or 300 may be attached or embedded within one or more host devices, such as within a housing of a portable communication device. For example, the data storage device 100 may be within a packaged apparatus such as a wireless telephone, a personal digital assistant (PDA), a gaming device or console, a portable navigation device, a computer device, or other device that uses internal non-volatile memory. Any of the data storage devices 100, 200, or 300 may include a non-volatile memory, such as a flash memory (e.g., NAND, NOR, Multi-Level Cell (MLC), Divided bit-line NOR (DINOR), AND, high capacitive coupling ratio (HiCR), asymmetrical contactless transistor (ACT), or other flash memories), an erasable programmable read-only memory (EPROM), an electrically-erasable programmable read-only memory (EEPROM), a read-only memory (ROM), a one-time programmable memory (OTP), three-dimensional (3D) memory devices, 3D diode-based memory devices, resistive memory devices, or any other type of non-volatile memory.

The illustrations of the embodiments described herein are intended to provide a general understanding of the various embodiments. Other embodiments may be utilized and derived from the disclosure, such that structural and logical substitutions and changes may be made without departing from the scope of the disclosure. This disclosure is intended to cover any and all subsequent adaptations or variations of various embodiments. Accordingly, the disclosure and the figures are to be regarded as illustrative rather than restrictive.

What is claimed is:

1. A data storage device comprising:
   a plurality of nonvolatile memory dies;
   a plurality of tracking circuits, wherein each tracking circuit is associated with one nonvolatile memory die; and
   a controller coupled to each of the plurality of nonvolatile memory dies and to each of the plurality of tracking circuits, wherein the controller is distinct from each tracking circuit and is configured to:
      maintain a first reliability measurement associated with a first portion of a first nonvolatile memory die of the plurality of nonvolatile memory dies, the first reliability measurement based on a first tracking circuit associated with the first nonvolatile memory die;
      determine that the first reliability measurement associated with the first portion of the first nonvolatile memory die exceeds a threshold;
      determine that a second reliability measurement based on a second tracking circuit associated with a second nonvolatile memory die is below the threshold; and
      transfer data from the first portion of the first nonvolatile memory die to the second nonvolatile memory die.

2. The data storage device of claim 1, wherein the second reliability measurement is associated with a second portion of the second nonvolatile memory die.

3. The data storage device of claim 1, wherein the first reliability measurement is associated with a count of memory accesses to the first portion of the first nonvolatile memory die.

4. The data storage device of claim 3, wherein the first reliability measurement is updated in response to each instance of memory access to the first portion of the first nonvolatile memory die.

5. The data storage device of claim 1, wherein the first reliability measurement is associated with a count of write operations to the first portion of the first nonvolatile memory die.

6. The data storage device of claim 5, wherein the first reliability measurement is updated in response to each instance of write operation to the first portion of the first nonvolatile memory die.

7. The data storage device of claim 1, wherein the first reliability measurement is associated with an elapsed time since a write time of the data to the first portion of the first nonvolatile memory die.

8. An apparatus comprising:
   first peripheral circuitry including first tracking circuitry, the first peripheral circuitry configured to communicate with a first nonvolatile memory die of a plurality of distinct nonvolatile memory dies; and
   a controller distinct from the first peripheral circuitry and configured to, in response to determining that a first reliability measurement associated with a first portion of the first nonvolatile memory die exceeds a threshold based on the first tracking circuitry, transfer data from the first portion of the first nonvolatile memory die via the first peripheral circuitry to a second nonvolatile memory die of the plurality of distinct nonvolatile memory dies, wherein a second reliability measurement based on second tracking circuitry that is included in second peripheral circuitry associated with the second nonvolatile memory die is below the threshold.

9. The apparatus of claim 8, further comprising a first peripheral die and a second peripheral die distinct from the first peripheral die, wherein the first peripheral die includes the first peripheral circuitry, wherein the second peripheral die includes the second peripheral circuitry, wherein the controller is configured to transfer the data to the second nonvolatile memory die of the plurality of distinct nonvolatile memory dies via the second peripheral circuitry, and wherein the second peripheral circuitry comprises the second tracking circuitry.

10. The apparatus of claim 8, wherein the controller is configured to maintain the first reliability measurement associated with the first portion of the first nonvolatile memory die based on the first tracking circuitry.

11. The apparatus of claim 8, wherein the controller is coupled to each nonvolatile memory die of the plurality of distinct nonvolatile memory dies via corresponding peripheral circuitry.

12. The apparatus of claim 8, wherein the controller is configured to maintain a corresponding reliability measurement associated with each of a corresponding plurality of portions of each nonvolatile memory die of the plurality of distinct nonvolatile memory dies based on tracking circuitry associated with each of the plurality of distinct nonvolatile memory dies.

13. The apparatus of claim 8, wherein the controller is further configured to:
   maintain multiple reliability measurements, each reliability measurement associated with a corresponding portion of the first nonvolatile memory die based on tracking circuitry associated with the first nonvolatile memory die;
   identify one or more portions of the first nonvolatile memory die associated with a reliability measurement that satisfies a corresponding threshold; and
   transfer data from each identified portion to a corresponding distinct portion of one or more other memory dies of the plurality of distinct nonvolatile memory dies.

14. The apparatus of claim 13, wherein each reliability measurement is associated with a count of memory accesses to the corresponding portion of the first nonvolatile memory die.

15. The apparatus of claim 14, wherein the multiple reliability measurements are maintained by, in response to each instance of memory access to a particular portion of the first nonvolatile memory die, updating the reliability measurement corresponding to the particular portion of the first nonvolatile memory die.

16. The apparatus of claim 13, wherein each reliability measurement is associated with a count of write operations to the corresponding portion of the first nonvolatile memory die.

17. The apparatus of claim 16, wherein the multiple reliability measurements are maintained by, in response to each instance of write operation to a particular portion of the first nonvolatile memory die, updating the reliability measurement corresponding to the particular portion of the first nonvolatile memory die.

18. The apparatus of claim 13, wherein each reliability measurement is associated with an elapsed time since a write time to the corresponding portion of the first nonvolatile memory die.

19. A method of managing wear leveling in a data storage device, the method comprising:
   determining, at first tracking circuitry associated with a first nonvolatile memory die, whether a first reliability measurement associated with a first portion of the first nonvolatile memory die exceeds a threshold, wherein the first nonvolatile memory die is one of a plurality of memory dies in the data storage device, and wherein the first tracking circuitry is coupled to a controller via a controller interface and is distinct from the controller;

sending, by the first tracking circuitry, a signal to the controller, the signal indicating that first data at the first portion of the first nonvolatile memory die is to be moved, the signal sent responsive to determining that the first reliability measurement associated with the first portion of the first nonvolatile memory die exceeds the threshold;

determining, by the controller, that a second reliability measurement at second tracking circuitry associated with a second portion of a second nonvolatile memory die is less than the threshold, wherein the second nonvolatile memory die is distinct from the first nonvolatile memory die, and wherein the second tracking circuitry is distinct from the controller and is distinct from the first tracking circuitry and is coupled to the controller via a second controller interface; and transferring the first data from the first portion of the first nonvolatile memory die to the second portion of the second nonvolatile memory die.

20. The method of claim 19, wherein the first data is transferred from the first portion of the first nonvolatile memory die to the second portion of the second nonvolatile memory die via first peripheral circuitry, the first peripheral circuitry comprising the first tracking circuitry and configured to communicate with the first nonvolatile memory die.

21. The method of claim 20, wherein the first data is transferred to the second nonvolatile memory die via second peripheral circuitry, the second peripheral circuitry comprising the second tracking circuitry and configured to communicate with the second nonvolatile memory die.

22. The method of claim 21, further comprising determining that a reliability measurement associated with a particular portion of a third nonvolatile memory die of the plurality of memory dies satisfies a corresponding threshold and in response to the determination, transferring second data stored in the particular portion of the third nonvolatile memory die to a fourth nonvolatile memory die of the plurality of memory dies.

23. The method of claim 22, wherein the second data is transferred via third peripheral circuitry, the third peripheral circuitry configured to communicate with the third nonvolatile memory die.

24. The method of claim 23, wherein the second data is transferred to the fourth nonvolatile memory die via fourth peripheral circuitry, the fourth peripheral circuitry configured to receive the second data from the third peripheral circuitry and to communicate the second data to the fourth nonvolatile memory die.

25. The method of claim 19, further comprising maintaining a corresponding reliability measurement associated with each portion of a plurality of portions of the first nonvolatile memory die.

26. The method of claim 19, further comprising maintaining a corresponding reliability measurement associated with each portion of a corresponding plurality of portions of each nonvolatile memory die of the plurality of memory dies.

27. The method of claim 19, wherein the controller is included in a controller die and wherein the first tracking circuitry in included in a peripheral die that is distinct from the controller die and that is distinct from the first nonvolatile memory die.

28. The method of claim 19, wherein a reliability measurement table associated with the first portion of the first nonvolatile memory die is usable to determine the first reliability measurement and is maintained by the first tracking circuitry.

29. The method of claim 28, wherein the reliability measurement table includes a plurality of reliability measurements.

30. The method of claim 19, wherein for each portion of a plurality of portions of each nonvolatile memory die, a corresponding reliability measurement is maintained.

31. The method of claim 19, wherein the first reliability measurement associated with the first portion of the first nonvolatile memory die is associated with a count of memory accesses to the first portion of the first nonvolatile memory die.

32. The method of claim 31, wherein the first reliability measurement associated with the first portion of the first nonvolatile memory die is updated in response to each instance of memory access to the first portion of the first nonvolatile memory die.

33. The method of claim 19, wherein the first reliability measurement associated with the first portion of the first nonvolatile memory die is associated with a count of write operations to the first portion of the first nonvolatile memory die.

34. The method of claim 33, wherein the first reliability measurement associated with the first portion of the first nonvolatile memory die is updated in response to each instance of write operation to the first portion of the first nonvolatile memory die.

35. The method of claim 19, wherein the first reliability measurement associated with the first portion of the first nonvolatile memory die is associated with an elapsed time since a write time of the first data to the first portion of the first nonvolatile memory die.

* * * * *